(12) United States Patent
Hartmann (10) Patent No.: US 11,148,889 B2
(45) Date of Patent: Oct. 19, 2021

(54) SINGULARIZING UNLOADER AND METHOD FOR UNLOADING AND SINGULARIZING PACKAGES PROVIDED IN A CONTAINER

(71) Applicant: Bernd Hartmann, Grafschaft-Leimersdorf (DE)

(72) Inventor: Bernd Hartmann, Grafschaft-Leimersdorf (DE)

(73) Assignee: Deutsche Post AG, Bonn (DE)

( * ) Notice: Subject to any disclaimer, the term of this patent is extended or adjusted under 35 U.S.C. 154(b) by 0 days.

(21) Appl. No.: 16/389,488

(22) Filed: Apr. 19, 2019

(65) Prior Publication Data

US 2019/0322475 A1    Oct. 24, 2019

(30) Foreign Application Priority Data

Apr. 19, 2018    (DE) .................. 10 2018 109 355.1

(51) Int. Cl.
   *B65G 65/02*    (2006.01)
   *B65G 65/23*    (2006.01)

(52) U.S. Cl.
   CPC ............. *B65G 65/02* (2013.01); *B65G 65/23* (2013.01); *B65G 2201/0235* (2013.01)

(58) Field of Classification Search
   CPC . B65G 65/02; B65G 65/23; B65G 2201/0235
   See application file for complete search history.

(56) References Cited

U.S. PATENT DOCUMENTS

| 3,754,671 | A | * | 8/1973 | Walda | .................. B65G 1/1371 |
| | | | | | 414/404 |
| 5,221,347 | A | * | 6/1993 | Heine | ................. B05B 13/0221 |
| | | | | | 118/300 |
| 5,641,052 | A | | 6/1997 | Lazzarotti et al. | |
| 6,558,103 | B2 | * | 5/2003 | Lilley | ................... B65G 65/23 |
| | | | | | 414/265 |
| 6,913,431 | B2 | * | 7/2005 | Lilley | ................... B65G 65/23 |
| | | | | | 414/354 |

(Continued)

FOREIGN PATENT DOCUMENTS

CN         102745511 A       10/2012
CN         105217326 A       1/2016

(Continued)

*Primary Examiner* — Gene O Crawford
*Assistant Examiner* — Lester Rushin, III
(74) *Attorney, Agent, or Firm* — Reinhart Boerner Van Deuren P.C.

(57) ABSTRACT

A singularizing unloader for unloading and singularizing packages provided in a container, having a pivoting installation for pivoting the container from a vertical receiving alignment for receiving the container to a horizontal emptying alignment for emptying the container, and having a holding installation for holding the container on the pivoting installation during the pivoting of the pivoting installation. A belt conveyor device for conveying the packages is connected to the pivoting installation in such a manner that the belt conveyor device by the pivoting of the pivoting installation from the receiving alignment to the emptying alignment is adjustable from a predominantly vertical initial position to a predominantly horizontal unloading position.

31 Claims, 7 Drawing Sheets

(56) References Cited

U.S. PATENT DOCUMENTS

| | | | |
|---|---|---|---|
| 7,472,788 B2* | 1/2009 | Bonora | B65G 15/12 |
| | | | 198/817 |
| 9,221,572 B2* | 12/2015 | Scagliola | B07C 1/04 |
| 9,415,949 B2* | 8/2016 | Buse | B65G 47/904 |
| 9,696,237 B2* | 7/2017 | Knestel | G01M 9/04 |
| 2007/0246328 A1 | 10/2007 | Reznik | |
| 2010/0003114 A1* | 1/2010 | Mather | B65B 69/00 |
| | | | 414/404 |
| 2016/0176661 A1* | 6/2016 | Vander Hoek | B66C 7/02 |
| | | | 414/413 |
| 2018/0362270 A1* | 12/2018 | Clucas | B25J 9/1679 |

FOREIGN PATENT DOCUMENTS

| | | | |
|---|---|---|---|
| DE | 10 2009 033 455 A1 | 9/2010 | |
| DE | 10 2015 213 644 A1 | 1/2017 | |
| EP | 0 968 942 A1 | 1/2000 | |
| EP | 3 072 838 A1 | 9/2016 | |
| FR | 2507581 A1 * | 12/1982 | ............. B65G 15/42 |
| NL | 8301397 A | 11/1984 | |
| WO | WO 2009/126109 A1 | 10/2009 | |

\* cited by examiner

SINGULARIZING UNLOADER AND METHOD FOR UNLOADING AND SINGULARIZING PACKAGES PROVIDED IN A CONTAINER

CROSS-REFERENCE TO RELATED PATENT APPLICATION

This patent application claims priority to German Application No. 10 2018 109 355.1, filed Apr. 19, 2018, the entire teachings and disclosure of which are incorporated herein by reference thereto.

FIELD

The method relates to a singularizing unloader for unloading and singularizing packages provided in a container, having a pivoting installation for pivoting the container from a predominantly vertical receiving alignment for receiving the container to a predominantly horizontal emptying alignment for emptying the container and vice versa, and having a holding installation for holding the container on the pivoting installation during the pivoting of the pivoting installation from the receiving alignment to the emptying alignment. The invention furthermore relates to a method for operating such a singularizing unloader.

BACKGROUND

Various installations for singularizing packages, thus packaged goods, in particular piece goods, in which the packages are initially present in a container are already known. The packages for the purpose of singularizing have first to be unloaded from said container. The unloading herein takes place either by manually emptying the container onto a conveyor or the like, or by tilting the container onto a conveyor belt or the like. The tilting of the container herein in some cases leads to not only the container being rotated but also to the container being lifted so as to be able to tip the packages onto a receptacle at a suitable height. In other words, the container, depending on requirements, is not only rotated but pivoted, in order for the packages to be tipped out. A respective pivoting installation which can be adjusted from a predominantly vertical receiving alignment for receiving the container to a predominantly horizontal emptying alignment for emptying the container and vice versa serves this purpose. The containers with packages are specifically provided so as to be typically upright so that the pivoting installation can receive the containers in a predominantly vertical alignment. In order for the containers to be emptied, the container has to be moved to a predominantly horizontal alignment while the packages without any further intervention would otherwise at least have the tendency to remain in the container. In order for the container during the pivoting to be securely held on the pivoting installation such that operational disruptions can be avoided, the singularizing unloader has a holding installation for holding the container on the pivoting installation. The container herein, in particular during the pivoting of the pivoting installation from the receiving alignment to the emptying alignment, is held on the pivoting installation. On account of the conveyor technology which adjoins the pivoting installation and in particular comprises a series of conveyor belts, the packages can be transported to the destination and herein be singularized.

The respective conveyor technology, like the technology for tipping out the containers, has been known for some time. The emptying of the containers containing the packages and the subsequent outward transport of the packages with the integrated singularization of the packages works very reliably in practice and can be implemented with a complexity that is justifiable in terms of apparatuses and construction. However, the known solutions fundamentally require rather a lot of space for the handling per se, thus the unloading and the singularizing of the packages.

The present invention is therefore based on the object of designing and refining the singularizing unloader and the method of in each case the type mentioned at the outset and described in more detail above such that the unloading of containers filled with packages and the singularizing of the respective packages can be performed in a more compact manner, that is to say at a higher throughput in relation to the required area.

BRIEF SUMMARY

This object in the case of a singularizing unloader is achieved in that a belt conveyor device for conveying the packages is connected to the pivoting installation in such a manner that the belt conveyor device by the pivoting of the pivoting installation from the receiving alignment to the emptying alignment is adjustable from a predominantly vertical initial position to a predominantly horizontal unloading position.

The object mentioned is furthermore achieved by a method for operating a singularizing unloader
- in which the container by way of the holding installation is held on the pivoting installation;
- in which the container by way of the pivoting installation is pivoted from the receiving alignment to the emptying alignment; and
- in which the packages of the container are at least partially transported out of the container by the belt conveyor device.

The invention has recognized that the conveyor-technical functions of the unloading of the packages from the container and the singularizing of the unloaded packages can be integrated instead of being processed sequentially. This means that the unloading and the singularizing at least in parts, thus pre-singularizing, for example, can be combined in spatial terms. This is achieved in that the belt conveyor device and the pivoting installation are combined such that the belt conveyor device is pivoted conjointly with the pivoting installation. While the pivoting installation is pivoted from the predominantly vertical receiving alignment to the predominantly horizontal emptying alignment, the belt conveyor device, parallel thereto or simultaneously, respectively, is adjusted from a predominantly vertical initial position to a predominantly horizontal unloading position. In this way, emptying of the packages onto the belt conveyor device which by way of the unloading can simultaneously be utilized for singularizing is achieved. After the emptying of the container, the pivoting installation, conjointly with the belt conveyor device, can again be adjusted back to the initial position, or the receiving alignment, respectively.

The integration of the emptying of the container and the singularizing of the packages can be facilitated in that the container does not have only an upper opening from which the packages can make their way out of the container. When the container, alternatively or additionally to such an upper opening, has a lateral opening from which the packages can make their way out of the container, the container does not have to be turned almost on its head. Pivoting to a predominantly horizontal alignment would then potentially suffice.

The term upper and lateral opening refers to the container in the original alignment thereof, thus for instance before the container by way of the holding installation is connected to the pivoting installation and consequently before the container has been pivoted by the pivoting installation. The lateral opening, if required, can be at least partially closed by a flap or at least a strap. This is the case, for example, in so-called roller containers.

The packages, if required, can thus come in contact with the belt conveyor while still in the container, for example as a result of a respective settling movement of the packages in order to be transported out of the container by the belt conveyor device, this simultaneously potentially representing the beginning of the singularizing of the packages.

In order for the container not to inadvertently fall from the pivoting installation and/or in order for the container to also be pivoted conjointly with the pivoting installation, a holding installation which can however be configured in very dissimilar ways as long as the holding installation can assume the function set forth above is provided. As a result of the predominantly vertical alignment of the pivoting installation in the receiving alignment and the simultaneously predominantly vertical alignment of the belt conveyor device in the initial position, the container and the belt conveyor device prior to the pivoting can at least in portions come to be superimposed in the horizontal direction. This is particularly expedient at the height level of a lateral opening of the container from which the packages can make their way out of the container when the pivoting installation and the belt conveyor device are situated in an at least predominantly horizontal alignment. Even when the packages in the respective alignment cannot make their way out of the lateral opening of the container, the respective horizontal superimposition of the opening and the belt conveyor device is expedient for instance when contact between the packages and the belt conveyor device is made by way of the opening, for example on account of a settling movement when pivoting, said horizontal superimposition at least facilitating the emptying of the container and/or at least partially causing the singularizing.

In this context it is pointed out that the method according to the invention is initially limited only to the packages of the container being at least partially transported out of the container by the belt conveyor device. The belt conveyor device is consequently provided such that the belt conveyor device facilitates the emptying of the container. The packages, when being emptied out of the container, at least in part thus make their way directly onto the belt conveyor device, or come into contact with the belt conveyor device, respectively.

A belt conveyor device is preferably understood to be a band conveyor in which at least one belt as the traction means for conveying the packages revolves continuously. The belt can also be configured as a wide belt, thus so as to be wider than a belt, in which case reference is in most instances made to a wide belt conveyor. However, other traction means such as those used in the case of so-called chain conveyors are also considered. However, since the use of belts is preferable, the term belt conveyor device will presently continue to be used. Belt conveyors having a plurality of continuously revolving belts or wide belts disposed beside one another can also be provided. Alternatively, a plurality of belt conveyors having at least one belt or wide belt can also be provided beside one another so as to form a plurality of belts and/or wide belts. A person skilled in the art will in principle have no difficulties in providing a suitable design embodiment of the belt conveyor device, which is why reference hereunder for the sake of simplicity and for avoiding unnecessary repetitions is made to belt conveyor device, belt conveyor unit, and belt conveyor without this being intended to mean exclusively belt conveyors according to the classic technical understanding, even when the latter are preferable. This herein can very fundamentally and also generally be installations which are usually assigned to the group of band conveyors and/or of chain conveyors.

The packages can be packaged goods and/or piece goods. There are fundamentally low limitations in terms of the size, the shape, and the type. However, in most instances it will be preferable for the packages to be able to be carried and handled by one person. According to the invention it is particularly advantageous for the packages to be so-called parcel consignments or parcels, respectively, which are used separately and are sorted and distributed in distribution centers.

For the sake of better understanding and for avoiding unnecessary repetitions, the singularizing unloader and the method for operating the same are collectively described hereunder without in each case differentiating in detail between the singularizing unloader and method. However, a person skilled in the art will derive by means of the respective context which features are respectively particularly preferable in terms of the singularizing unloader and the method.

In the case of a first particularly preferred design embodiment of the singularizing unloader the belt conveyor device comprises a plurality of, preferably at least three, furthermore preferably at least five, particularly at least seven, belt conveyors disposed beside one another. The plurality of belt conveyors permits dissimilar transporting speeds to be set for each belt conveyor or at least specific belt conveyors, so as to on account thereof facilitate and/or accelerate the singularizing of the packages. The transporting speed of a belt conveyor herein is preferably seen as the belt speed in the transporting direction of the belt conveyor. The transporting speed of the belt can consequently be identical to the speed at which a package is conveyed along the belt of the belt conveyor. This is however not mandatory. The package can in particular be decelerated in relation to the respective belt, such that the speed of the package deviates from the transporting speed of the belt. Independently thereof, it is furthermore preferable for a singularization in parallel with the targeted transport of the packages when the belt conveyors define at least substantially parallel transporting directions. The packages in this instance can be conveyed in a common direction and herein furthermore be at least partially singularized.

When the transporting speed of the inner belt conveyors of the belt conveyor device is slower than the transporting speed of the outer belt conveyors of the belt conveyor device, the packages are decongested along the belt conveyor device, this contributing toward the singularization of the packages. This effect is achieved in a particularly effective manner when the transporting speeds of the belt conveyors increase in each case incrementally from the inside to the outside, transversely to the transporting direction of the belt conveyor device. In other words, a speed profile of the belt conveyor device that transversely to the transporting direction of the belt conveyor is at least substantially U-shaped or V-shaped results.

When the belt conveyors of the belt conveyor device are provided so as to be mutually directly contiguous, the belt conveyor device can efficiently be used for transporting the packages, on the one hand, and for singularizing the packages, on the other hand, this increasing the compactness and thus the throughput of the singularizing unloader. Alternatively or additionally, the belt conveyors of the belt conveyor device can be configured so as to be of at least substantially identical length. This also serves to the end that the belt conveyor device can be utilized as efficiently as possible. Moreover, if required, a uniform transition from the belt conveyor device to an adjoining conveyor installation for the onward transport of the packages results in this instance.

Alternatively or additionally, for a parallel disposal of the belt conveyors and a uniform transport of the packages it can also be expedient when in the transporting direction rearward ends of the belt conveyors of the belt conveyor device lie at least substantially on one plane, and/or when in the transporting direction forward ends of the belt conveyors of the belt conveyor device lie at least substantially on one plane. The planes mentioned herein are preferably to be understood to be perpendicular to the transporting direction of the belt conveyor device. For example, a uniform end of the belt conveyor device, be it at the start and/or at the end of the belt conveyor device when seen in the transporting direction is thus achieved across the width, this potentially serving for a more compact and more efficient integration of the singularizing unloader in a more comprehensive conveyor system.

In order for the weight forces acting on the packages to also be utilized for the transport and/or the singularization of the packages, it is expedient when the belt conveyor device for transporting the packages forms a convexly upward curved transport surface of the belt conveyor device. The packages in this instance are not only moved in the transporting direction but also slide more or less, or partially, respectively, laterally from the belt conveyor device. Movements of the packages in two mutually perpendicular directions can thus simultaneously be used for the singularization of the packages. This applies particularly when the transport surface in at least one cross section perpendicular to the transporting direction of the belt conveyor device is bent so as to be at least substantially U-shaped. A belt conveyor device bent so as to be U-shaped can be understood to be, for example, a belt conveyor device that is bent in the shape of a segment of a circle, or according to part of an oval. The free legs of the U herein consequently neither have to point upward nor be mutually parallel so as to obtain a U-shaped design of the transport surface of the belt conveyor device. For example, it suffices when the belt conveyor device is arched toward the top, or is configured so as to be arcuate or concave, respectively. The term U-shaped is intended to express that a shape having arbitrary troughs and peaks along the cross section, or the width, respectively, of the belt conveyor device is less preferable. For the reasons mentioned, it is moreover further preferable when very many cross sections of the transport surface perpendicular to the transporting direction of the belt conveyor device are bent so as to be at least substantially U-shaped, or when the transport surface, at least substantially across the entire longitudinal extent of the transport surface, transversely to the transporting direction has a cross section that is at least substantially U-shaped. The term U-shaped here too is in turn preferably to be understood in the manner set forth above.

Besides the belt conveyor device, a belt conveyor unit can yet be provided, if required, said belt conveyor unit being able to adjoin the belt conveyor device so as to serve for the onward transport of at least some packages. It is in particular provided herein that the belt conveyor unit and the belt conveyor device in the unloading position have at least substantially parallel transporting directions. A space-saving continuous transport of the packages in at least substantially one direction which is superimposed by a singularization can thus be performed. It is particularly effective and simultaneously particularly efficient herein for the belt conveyor unit and the belt conveyor device to be aligned so as to be at least substantially mutually contiguous behind one another. No installation space is thus wasted, for example, and, if required, an aligned disposal of the belt conveyor device and the belt conveyor unit can be chosen, said aligned disposal ensuring a steady movement of the packages and simultaneously being gentle on the packages. Undesirable damage to the packages can thus be avoided.

For the same reasons as has already been described above in the context of the belt conveyor device, the term belt conveyor unit and not, for instance, generally a band conveyor unit or a chain conveyor unit is presently used. The use of belt conveyors is specifically preferable here, despite the fact that the belt conveyor unit could also comprise at least one wide belt conveyor or a chain conveyor. Wide belts and belts herein fundamentally differ in that belts are typically narrower than wide belts. However, belts and wide belts as traction means revolve continuously. Chain conveyors are more complex, heavier, and more maintenance-intensive, which is why said chain conveyors are less preferable but nevertheless also not excluded. Since belt conveyors are actually preferable, the term belt conveyor unit is used, and reference in detail to the potential different design embodiments at all times is dispensed with so as to avoid any unnecessary repetitions. The terms belt conveyor unit and belt conveyor device herein are however in principle not used so as to be limiting in terms of belt conveyors. The respective design embodiment options of the description are obvious to a person skilled in the art by means of the respective context.

The belt conveyor unit also preferably comprises a plurality, preferably at least three, furthermore preferably at least five, particularly at least seven, belt conveyors disposed beside one another. The plurality of the belt conveyors permits dissimilar transporting speeds to be set for each belt conveyor or at least specific belt conveyors so as to on account thereof facilitate and/or accelerate the singularizing of the packages. The transporting speed of a belt conveyor herein is preferably viewed as the belt speed in the transporting direction of the belt conveyor. The transporting speed of the belt can consequently be identical to the speed at which a package is conveyed along the belt of the belt conveyor. This is however not mandatory. The package can in particular be decelerated in relation to the respective belt such that the speed of the package deviates from the transporting speed of the belt. Independently thereof, it is furthermore preferable for a singularization in parallel with the targeted transport of the packages when the belt conveyors define at least substantially parallel transporting directions. The packages in this instance can be conveyed in a common direction and herein furthermore be at least partially singularized.

When the transporting speed of the inner belt conveyors of the belt conveyor unit is slower than the transporting speed of the outer belt conveyors of the belt conveyor unit, the packages are decongested along the belt conveyor unit, this contributing toward the singularization of the packages. This effect is achieved in a particularly effective manner when the transporting speeds of the belt conveyors increase in each case incrementally from the inside to the outside, transversely to the transporting direction of the belt conveyor unit. In other words, a speed profile of the belt conveyor device that transversely to the transporting direction of the belt conveyor is at least substantially U-shaped or V-shaped results.

When the belt conveyors of the belt conveyor unit are provided so as to be mutually directly contiguous, the belt conveyor unit can efficiently be used for transporting the packages, on the one hand, and for singularizing the packages, on the other hand, this increasing the compactness and thus the throughput of the singularizing unloader. Alternatively or additionally, the belt conveyors of the belt conveyor unit can be configured so as to be of at least substantially identical length. This also serves to the end that the belt conveyor unit can be utilized as efficiently as possible. Moreover, if required, a uniform transition to the belt conveyor unit and/or from the belt conveyor device to an adjoining conveyor installation for the onward transport of the packages results in this instance.

Alternatively or additionally, for a parallel disposal of the belt conveyors and a uniform transport of the packages it can also be expedient when in the transporting direction rearward ends of the belt conveyors of the belt conveyor unit lie at least substantially on one plane, and/or when in the transporting direction forward ends of the belt conveyors of the belt conveyor unit lie at least substantially on one plane. The planes mentioned herein are preferably aligned to be at least substantially vertical and/or at least substantially perpendicular to the transporting direction of the belt conveyor unit. For example, a uniform end of the belt conveyor unit, be it at the start and/or at the end of the belt conveyor unit when seen in the transporting direction is thus achieved across the width, this potentially serving for a more compact and more efficient integration of the singularizing unloader in a more comprehensive conveyor system.

In order for the weight forces acting on the packages to also be utilized for the transport and/or the singularization of the packages, it is expedient when the belt conveyor unit for transporting the packages forms a convexly curved transport surface of the belt conveyor unit. The packages in this instance are not only moved in the transporting direction but also slide more or less, or partially, respectively, laterally from under the belt conveyor unit. Movements of the packages in two mutually perpendicular directions can thus simultaneously be used for the singularization of the packages. This applies particularly when the transport surface in at least one cross section perpendicular to the transporting direction of the belt conveyor unit is bent convexly upwards so as to be at least substantially U-shaped. The free legs of the U herein however neither have to point upward nor be mutually parallel so as to obtain a U-shaped design of the transport surface of the belt conveyor unit. For the reasons mentioned, it is moreover further preferable when very many cross sections of the transport surface perpendicular to the transporting direction of the belt conveyor unit are bent so as to be at least substantially U-shaped, or when the transport surface, at least substantially across the entire longitudinal extent of the transport surface, transversely to the transporting direction has a cross section that is at least substantially U-shaped. The term U-shaped herein is preferably to be understood in the wide sense, as has already been described above.

At least one lateral belt conveyor can adjoin at least one of the sides of the belt conveyor device in the unloading position of the belt conveyor device. Packages which make their way laterally down the belt conveyor can thus be received and discharged by the lateral belt conveyor. There can be many reasons therefor. In the unloading of the packages from the container, many of said packages initially lie on top of one another and then in part fall sideways. When the transport surface is inclined sideways, packages can moreover slide laterally from the belt conveyor device. In order for the respective singularization of the packages to be facilitated, it is consequently particularly expedient when one lateral belt conveyor is provided in each case on the belt conveyor device in the unloading position on both sides thereof. Packages making their way to both sides of the belt conveyor can thus make their way onto the lateral belt conveyors and be transported away by way of the lateral belt conveyors. For the same reasons, at least one lateral belt conveyor can in each case adjoin the belt conveyor unit on at least one side, wherein this, if required, can be the same at least one lateral belt conveyor which is provided laterally on the belt conveyor device. However, here too it is furthermore preferable when at least one lateral belt conveyor is in each case provided on both sides of the belt conveyor unit. The at least one lateral belt conveyor device, for the sake of simplicity and reliability, will presently comprise in particular at least one band conveyor and/or chain conveyor. The band conveyor herein, for the sake of the transport surface of the traction means which transports the packages, will preferably be configured as a wide belt conveyor. The lateral belt conveyor device can also comprise at least one other band conveyor, in particular a belt conveyor or a chain conveyor. A person skilled in the art herein will be in a position to provide a suitable lateral belt conveyor device for specific applications.

When a plurality of lateral belt conveyors that are operated at dissimilar transporting speeds are disposed behind one another at least on one side of the belt conveyor device and/or the belt conveyor unit, the dissimilar transporting speeds in the transporting direction can be utilized for an incremental singularization of the packages. This is possible in a manner that is particularly effective and gentle to the packages when the respective lateral belt conveyors are disposed so as to be aligned behind one another.

For the sake of simplicity, the holding installation can represent or comprise a receptacle. The container in this instance can be moved into the receptacle in a simple manner so as to be subsequently be pivoted by the pivoting installation and the belt conveyor device. By way of the shape of the receptacle it can also be prevented in a simple manner that the container slides laterally from the pivoting installation. In order for the container to be readily pivoted, consequently be lifted in a corresponding manner, a support surface for the container onto which the container is placed prior to the pivoting is expedient. When the support surface is pivoted conjointly with the pivoting installation, simultaneous pivoting of the container can thus be achieved in a simple manner.

For the sake of simplicity herein it is fundamentally particularly preferable when the receptacle and/or the support surface are/is adjustable conjointly with the belt conveyor device from the initial position to the unloading position. In this instance, the belt conveyor device and the container can be pivoted but substantially maintain the relative position to one another. It has proven expedient herein for the unloading when the support surface and the belt conveyor device define planes that are mutually disposed at an angle from 60° to 90°, preferably 70° to 90°, particularly 80° to 90°. The support surface and the belt conveyor device are thus consequently at least substantially mutually perpendicular. The container in this instance can be favorably supported by the belt conveyor device during the pivoting.

The singularizing unloader can in principle be used with very dissimilar containers. It is particularly simple herein when the containers have rollers by way of which the containers can be pushed toward the pivoting installation, in particular into the receptacle and/or onto the support surface of the pivoting installation. Corresponding containers can be, for example, so-called roller containers or flexicarts. In principle, however, it is also conceivable for containers without rollers to be used, thus pallet containers or parcel bags, for example. The containers should preferably only be able to be tilted in some manner, or the packages to be tipped into the container in some manner, respectively.

In the case of a first particularly preferred design embodiment of the method, the container by way of a lateral opening that faces the belt conveyor device is held on the pivoting installation. It can thus be achieved that the packages, as a result of the pivoting, make their way out of the opening of the container and come into direct contact with the belt conveyor device which can facilitate the emptying of the container and/or facilitate the singularizing of the packages. This is possible in a particularly effective manner when the packages, with the belt conveyor device in the unloading position, make contact with the belt conveyor device by way of the lateral opening of the container. The packages consequently do not first have to be completely tipped out, but the packages at least in parts already make contact with the belt conveyor device during the tipping.

When pivoting, the at least one belt conveyor of the belt conveyor device can be stationary since the belt conveyor here, if at all, can only fulfil a limited function. In any case, it would however be expedient for the at least one belt conveyor of the belt conveyor device to be moved in the transporting direction of the belt conveyor device. When the at least one belt conveyor of the belt conveyor device, with the belt conveyor device in the unloading position, is moved in the transporting direction, the emptying and the singularizing, as a result of the emptying of the container, can be facilitated by the at least one belt conveyor of the belt conveyor device. Alternatively or additionally, in the case of a plurality of belt conveyors of the belt conveyor device provided beside one another, the belt conveyors can in each case be moved at an incrementally higher transporting speed from the inside to the outside. The unloading of the packages is facilitated in this way, and an at least partial singularizing of the packages is caused.

Very fundamentally, it can be expedient independently of the number of the belt conveyors of the belt conveyor device when the packages slide at least partially along the convex transport surface of the belt conveyor device slide laterally downward onto at least one lateral belt conveyor which is situated laterally to the belt conveyor device. This also serves for the singularizing of the packages. This is the case even more when the packages on both sides of the belt conveyor device slide onto lateral belt conveyors that are provided on both sides of the belt conveyor device. The singularizing is rendered possible in a very efficient manner when the packages are moreover singularized at least partially along a plurality of lateral belt conveyors that are disposed so as to be preferably aligned behind one another. This is the case in particular when the packages are singularized by way of a plurality of lateral belt conveyors behind one another on both sides of the belt conveyor device. The singularization herein is facilitated in that the lateral belt conveyors disposed behind one another are moved at dissimilar, in particular increasing, transporting speeds.

In order for a longer distance to be able to be provided for the singularization of the packages, without having to take into account a disproportional constructive complexity for the pivoting installation, the packages from the belt conveyor device can be at least partially transferred in the emptying position in the transporting direction of the belt conveyor device to a belt conveyor unit which adjoins, preferably so as to be aligned therewith, the belt conveyor device. The belt conveyor device and the belt conveyor unit can thus interact for singularizing and transporting the packages. For the sake of simplicity it is particularly expedient herein when the transferred packages from the belt conveyor unit are at least partially transported in a transporting direction that is at least substantially parallel to the transporting direction of the belt conveyor device. No curves have thus to be provided, and a renewed local compression of the packages does not inadvertently arise.

The belt conveyor unit can have a plurality of belt conveyors which are disposed beside one another. In this instance, it is expedient for the belt conveyors, provided beside one another, of the belt conveyor unit to be in each case moved at a transporting speed that increases incrementally from the inside to the outside. This leads to a speed profile transverse to the belt conveyor unit which facilitates the singularization of the packages.

When the packages slide at least partially along the convex transport surface of the belt conveyor unit laterally and downward onto at least one lateral belt conveyor, this can likewise facilitate the singularization of the packages. Alternatively or additionally, the packages can at least partially be singularized along a plurality of lateral belt conveyors that are disposed, preferably so as to be aligned, behind one another. This also facilitates the singularization of the packages, specifically in particular when the transporting speed of the lateral belt conveyors disposed behind one another increases incrementally. It is particularly effective in this context when the lateral belt conveyors are disposed lateral to the belt conveyor device, and the lateral belt conveyors are in each case disposed behind one another so as to be lateral to the belt conveyor unit. When the lateral belt conveyors in this instance are also mutually aligned, the transport is very gentle for the packages.

The emptying of the container can be initiated in a very simple manner when the container in the receiving alignment of the pivoting installation is first moved or placed into a receptacle and/or onto a support surface for the container. This requires few manipulations which can moreover be accomplished in an easy and reliable manner. If required, the reliability of the method can be increased when the container that, if required, stands on the support surface, during the pivoting of the pivoting installation is held by the holding installation, in particular is received by the receptacle. A respective receptacle herein permits in a rather simple manner the reliable holding of the container during the pivoting.

BRIEF DESCRIPTION OF THE DRAWINGS

The invention will be described hereunder in more detail by means of a drawing illustrating only an exemplary embodiment. In the drawing.

DETAILED DESCRIPTION

Figure 1A:
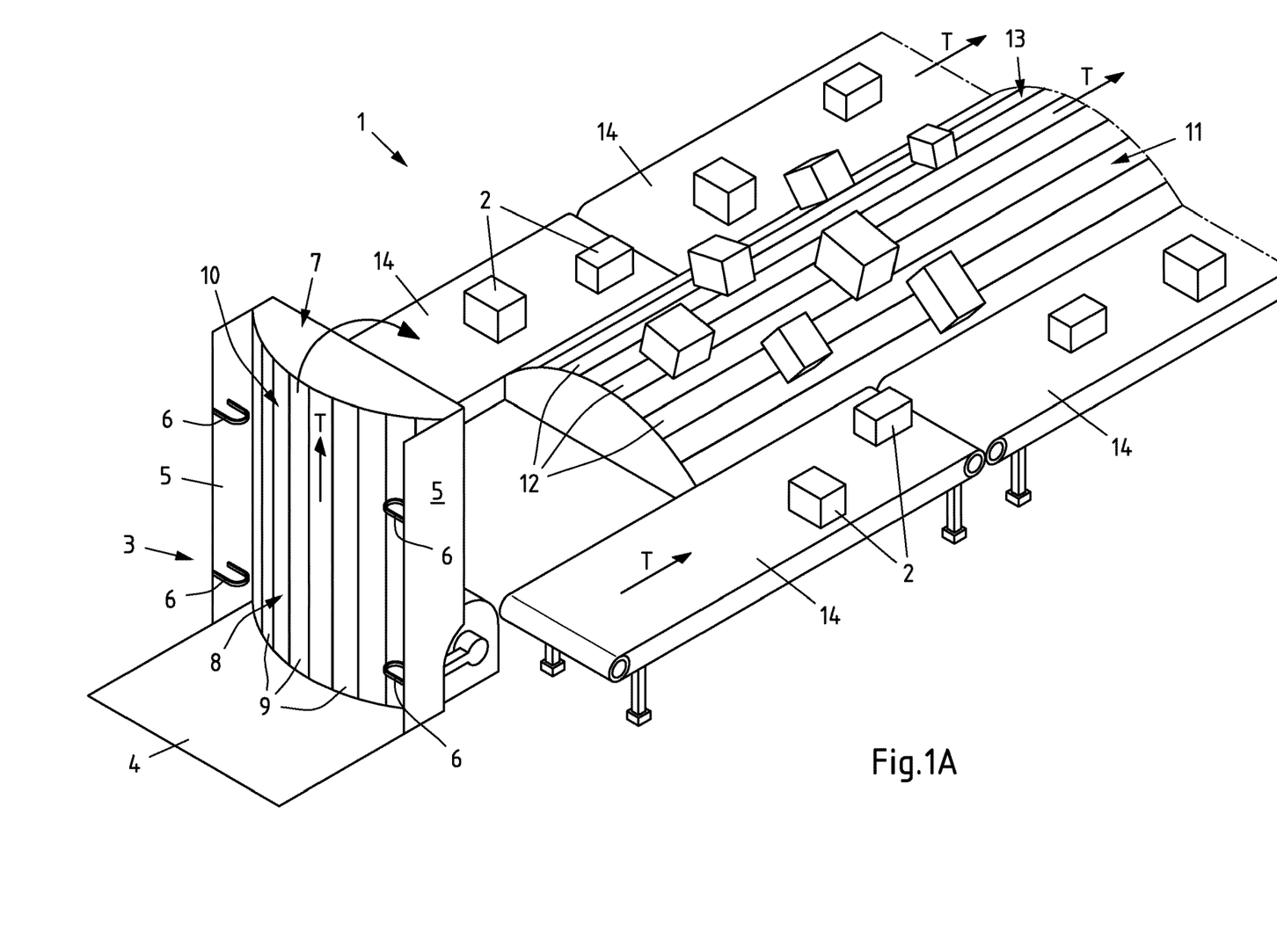
FIGS. 1A-B show a singularizing unloader according to the invention having a pivoting installation in a receiving alignment and an emptying alignment, in each case in a schematic, perspective view.
Figure 1B:
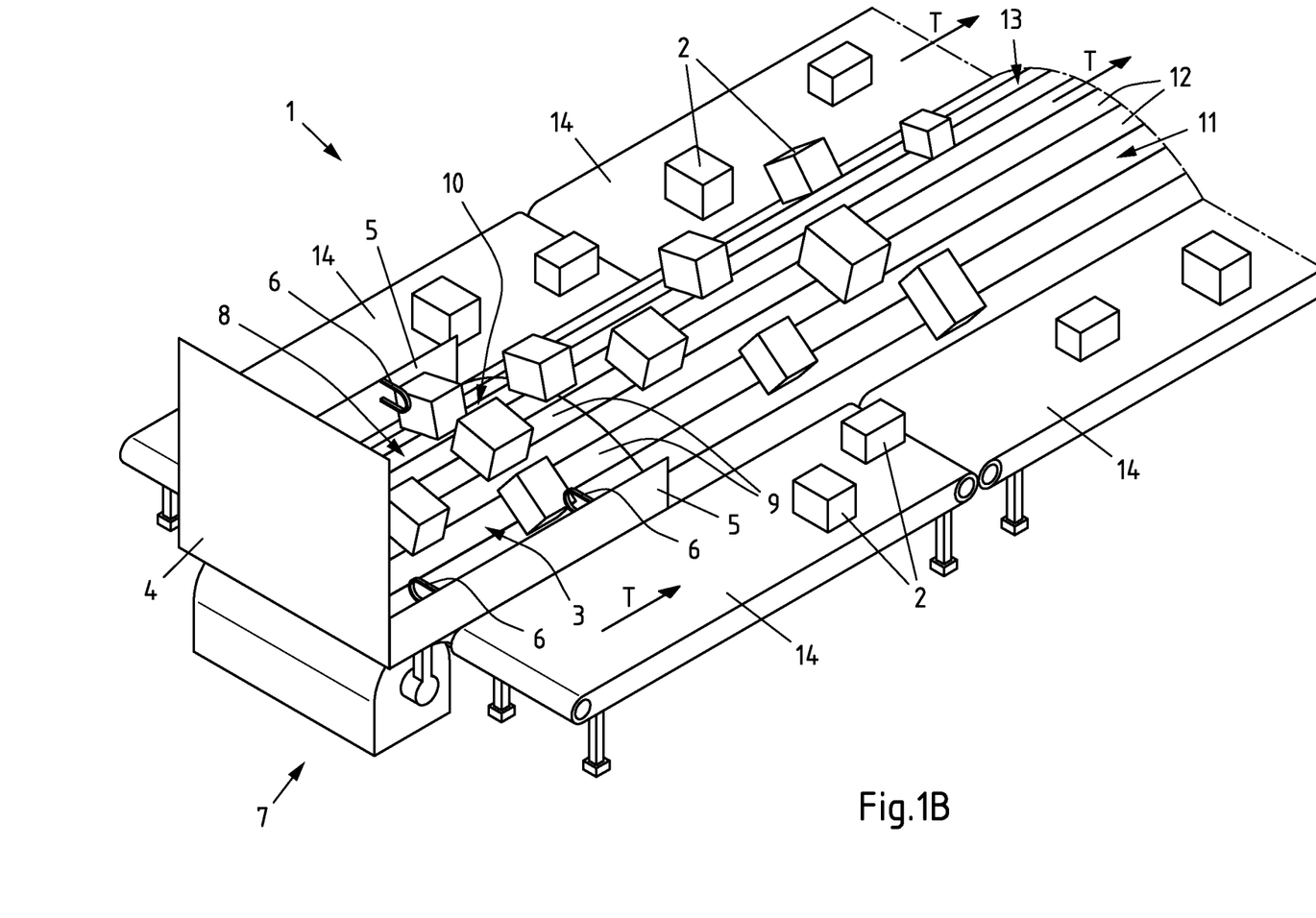

A singularizing unloader 1 for unloading a container loaded with packages 2 and for singularizing the packages 2 of the container is illustrated in FIGS. 1A-B. For the sake of improved clarity, no container comprising the packages is shown in FIGS. 1A-B. The singularizing unloader 1 for receiving the container has a receptacle 3 which at the lower end thereof has a support surface 4 onto which the container can be placed. In the case of the singularizing unloader 1 illustrated, and to this extent preferred, a holding installation 5 for securely holding the container during the emptying is moreover provided, said holding installation 5, besides the receptacle 3 and the support surface 4, yet comprising holding means 6 for fixing the container. The holding installation 5 herein is configured as part of pivoting installation 7 which, for unloading the container, can be pivoted conjointly with the container from the receiving alignment illustrated in FIG. 1A to the emptying alignment illustrated in FIG. 1B.

In the case of the singularizing unloader 1 illustrated, and to this extent preferred, the holding installation 5 is provided on the pivoting installation 7 such that the container is held so as to be contiguous to a belt conveyor device 8 which in turn, as part of the pivoting installation 7, can be pivoted conjointly with the container. In the receiving alignment of the pivoting installation 7 illustrated in FIG. 1A, not only the pivoting installation 7 but also the belt conveyor device 8 is aligned so as to be at least predominantly or at least approximately vertical. In the case of the belt conveyor device 8 this alignment corresponds to the initial position. By contrast, the pivoting installation 7 and the belt conveyor device 8 in FIG. 1B are aligned so as to be at least predominantly or at least approximately horizontal, wherein the belt conveyor device 8 illustrated therein is situated in the unloading position.

The belt conveyor device 8 illustrated, and to this extent preferred, has nine belt conveyors 9 which are disposed so as to be directly mutually contiguous and beside one another. The belt conveyors 9 illustrated, and to this extent preferred, are not only disposed so as to be mutually parallel but are also drivable in parallel transporting directions T. The belt conveyors 9 are furthermore at least substantially of identical length and extend at least substantially between a common starting plane and a common terminal plane of the belt conveyors 9, wherein the starting plane and the terminal plane are aligned so as to be perpendicular to the transporting direction T of the belt conveyor device 8. The plurality of the belt conveyors 9 disposed beside one another conjointly form a transport surface 10 of the belt conveyor device 8 on which and along which the packages 2 can be transported, specifically at least when the belt conveyor device 8 is situated in the unloading position. The transport surface 10 herein is disposed so as to be convex and, when viewed in the transporting direction T of the belt conveyor device 8, drops downward on both sides of the belt conveyor device 8. The transport surface 10 herein is configured such that the transport surface 10 in the unloading position of the belt conveyor device 8 on both sides of the belt conveyor device 8 at least partially drops downward in the direction of gravity, such that a transport surface 10 which in the cross section and at least substantially across the entire length of the belt conveyor device 8 is U-shaped results. On account of the upward directed convex curvature of the transport surface 10, the U-shape formed by the transport surface 10 is open toward the bottom.

The belt conveyor device 8 in the unloading position of the belt conveyor device 8 is adjoined by a belt conveyor unit 11, said belt conveyor device 8 and said belt conveyor unit 11 in the case of the singularizing unloader 1 illustrated, and to this extent preferred, being mutually aligned both in terms of the height as well as on both sides. In other words, the belt conveyor device 8 and the belt conveyor unit 11 are disposed so as to be of identical width and identical height. The belt conveyor unit 11, like the belt conveyor device 8, moreover has a plurality of, in this case nine, belt conveyors 12. The belt conveyors 12 are disposed so as to be parallel and directly mutually contiguous, which is why the belt conveyors 12 can be moved in the same transporting direction T which in the case of the singularizing unloader 1 illustrated, and to this extent preferred, corresponds to the transporting direction T of the belt conveyor device 8. In addition, the belt conveyors 12 of the belt conveyor unit 11, as well as the belt conveyors 9 of the belt conveyor device 8, can be driven at dissimilar transporting speeds. The transporting speed preferably increases in each case incrementally from the central belt conveyor 12 toward the two outer belt conveyors 12. In other words, the belt conveyors 9, 12, when viewed from the center toward each of the sides, move ever faster, specifically in the case of the belt conveyor device 8 as well as in the case of the belt conveyor unit 11. The belt conveyor device 8 and the belt conveyor unit 11 are also similar to the extent that the belt conveyors 9, 12 disposed beside one another form a convex, upward curved, transport surface 10, 13 which in the cross section, and specifically presently at least along the entire length, has a U-shape that is open toward the bottom. The U-shaped cross sections of the belt conveyor device 8 and of the belt conveyor unit 11 in the case of the singularizing unloader 1 illustrated, and to this extent preferred, herein are at least substantially mutually aligned.

Besides the belt conveyor device 8 and the belt conveyor unit 11, a plurality of lateral belt conveyors 14 disposed on both sides behind one another, which presently are configured as band conveyors, in particular as wide belt conveyors, are provided, said lateral belt conveyors 14 being able to receive packages 2 from the belt conveyor device 8 and the belt conveyor unit 11 and to transport said packages 2 onward. Moreover, the lateral belt conveyors 14 can be moved at dissimilar transporting speeds, specifically preferably at transporting speeds that incrementally increase in the transporting direction T.

Figure 2A:
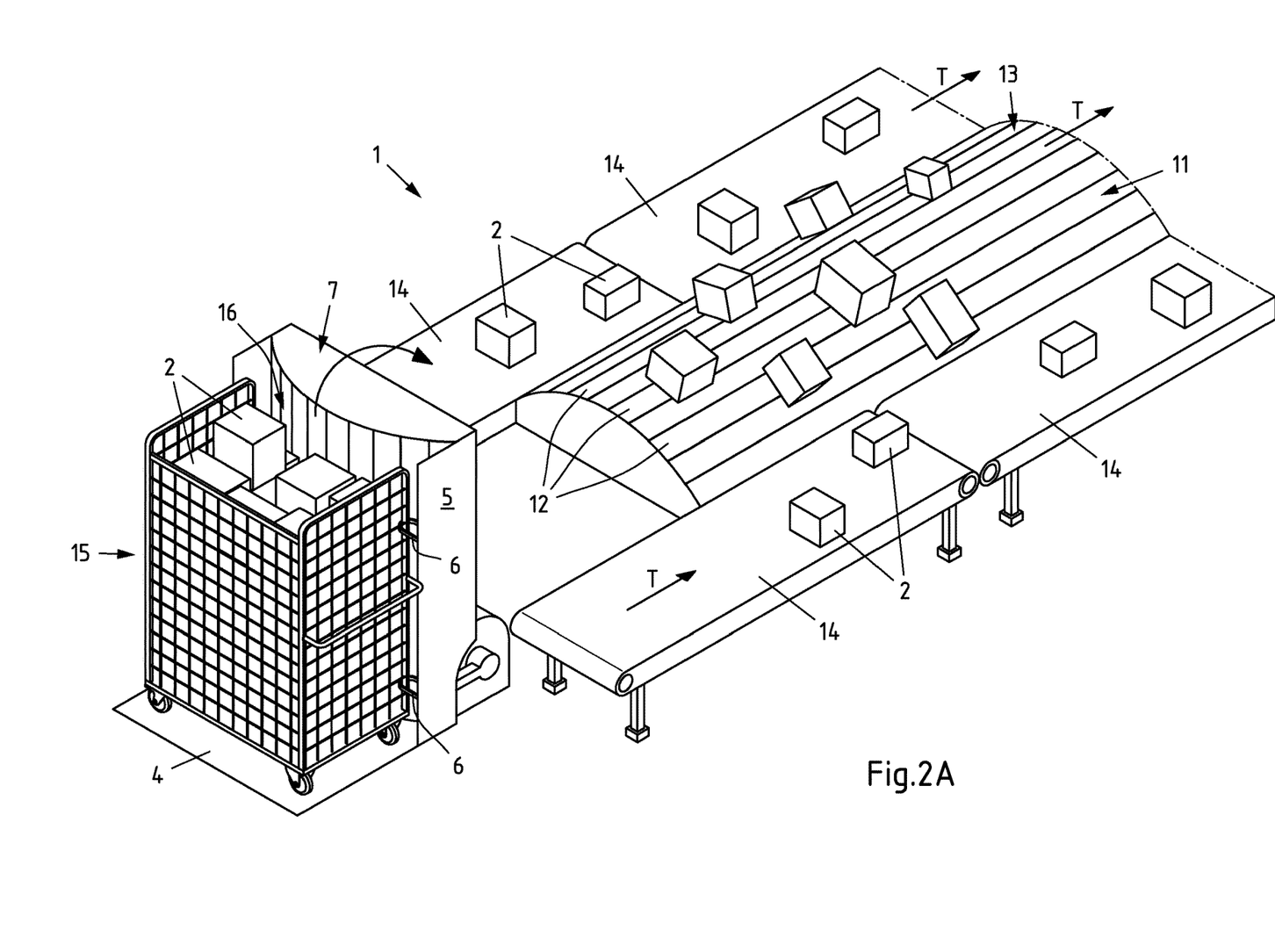
FIGS. 2A-C show the incremental unloading of a container and the singularizing of the packages by way of the singularizing unloader from FIG. 1, having the pivoting installation in the receiving alignment, in an intermediate alignment, and in the emptying alignment, in each case in a schematic, perspective view.
Figure 2B:
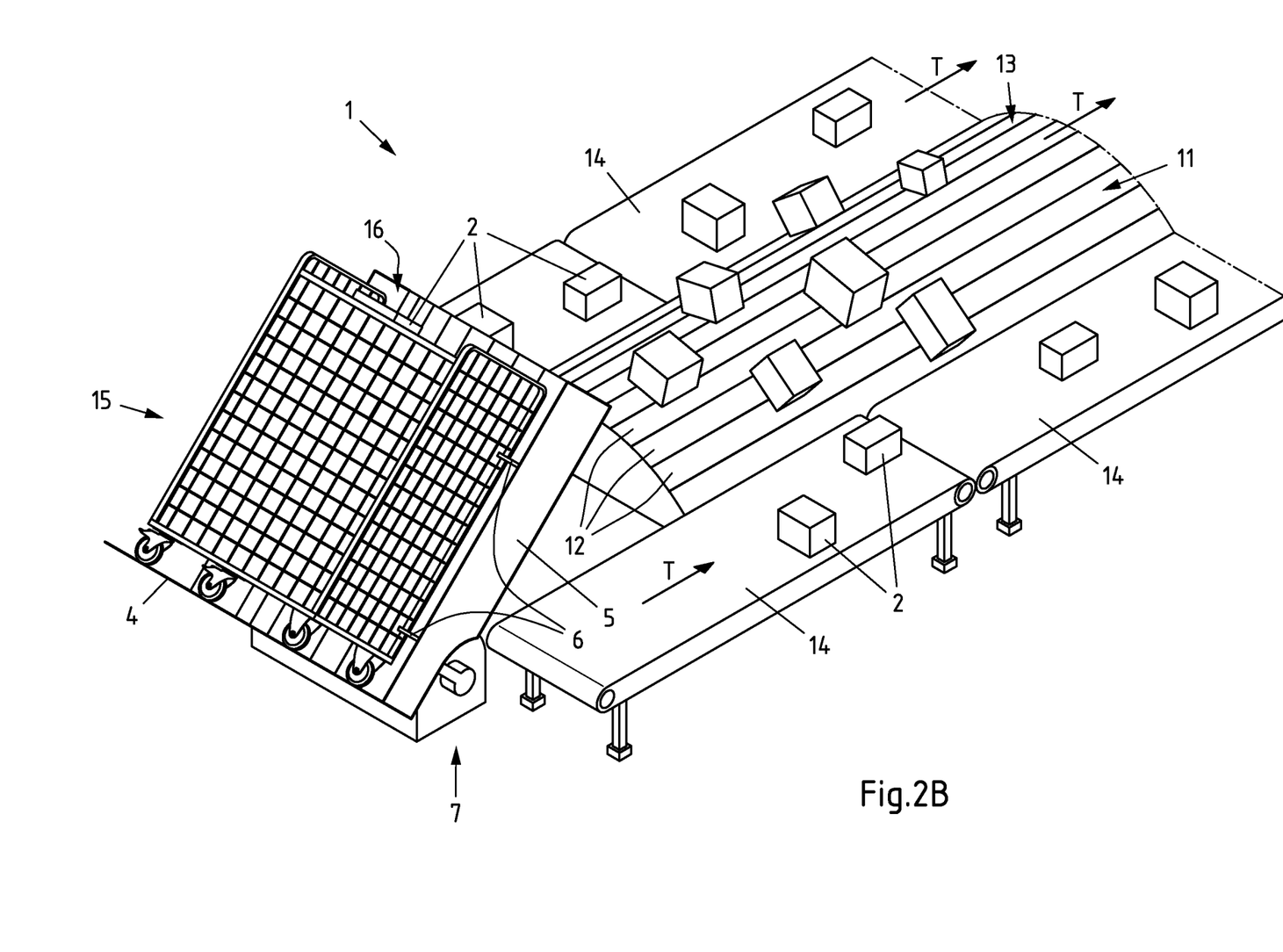
Figure 2C:
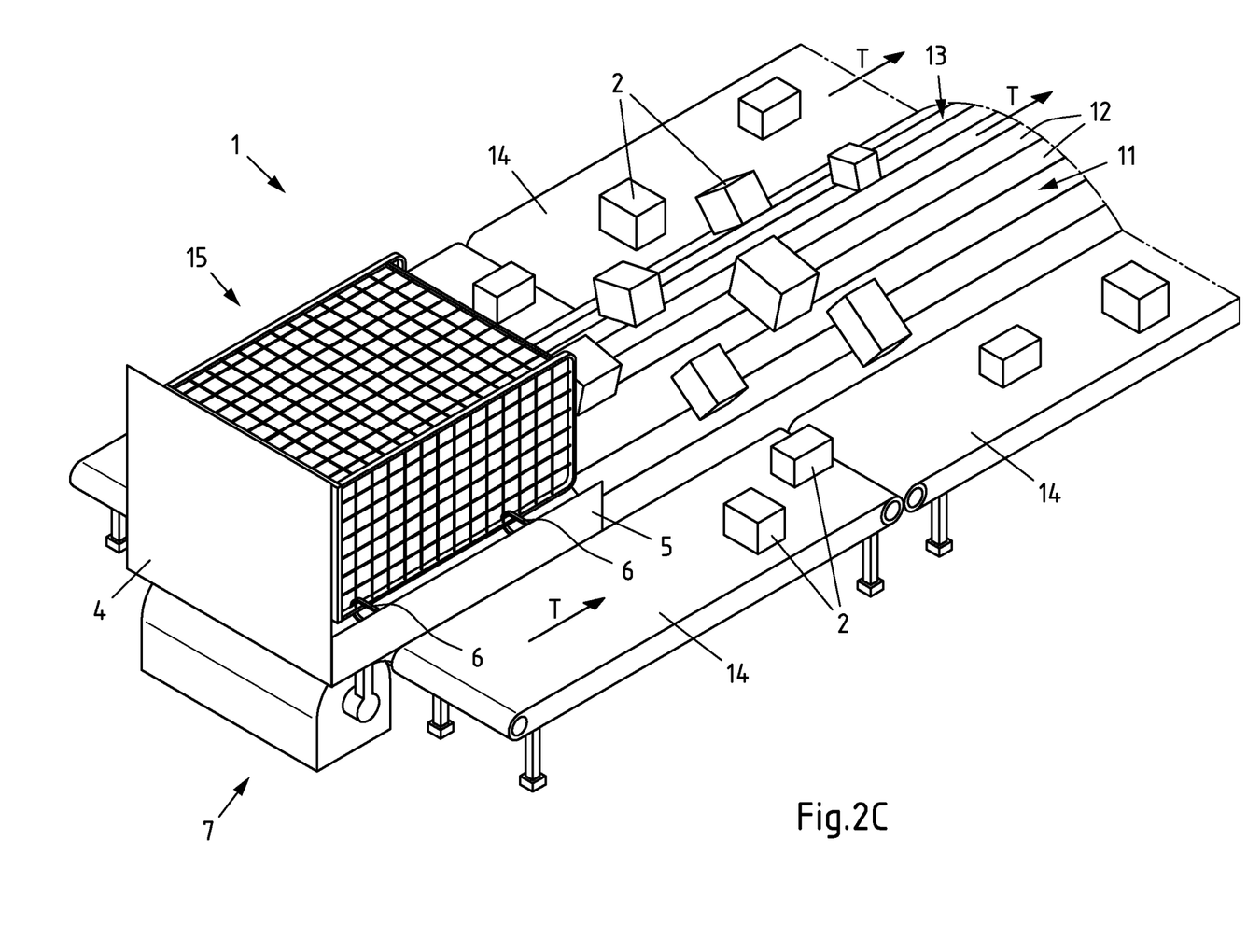

The unloading and singularizing of packages 2 by way of the singularizing unloader 1 from FIG. 1 is illustrated in FIGS. 2A-C. The pivoting installation 7 in FIG. 2A is situated in the receiving alignment, and the belt conveyor device 8 that is connected to the pivoting installation 7 is situated in the initial position. In this position of the singularizing unloader 1, a container 15 which in the exemplary embodiment illustrated, and to this extent preferred, is a roller container, is pushed into the receptacle 3 of the holding installation 5 of the pivoting installation 7. The container 15 herein is pushed onto the support surface 4 of the holding installation 5, said support surface 4 being able to be pivoted conjointly with the pivoting installation 7 and the belt conveyor device 8. The container 15 is moreover fixedly connected to the pivoting installation 7 by way of holding means 6 (only schematically illustrated). In the case of the present container 15 a lateral opening 16 which, if required, is at least partially closable is moreover opened, unless said opening 16 has already been opened prior to the insertion of the container 15 into the receptacle 3 of the pivoting installation 7. Depending on the design embodiment of the container 15, at least one flap and/or at least one strap can be released on the side of the container 15 that points toward the belt conveyor device 8, so as to laterally open the container 15 on the respective side. The packages 2 of the container 15 consequently do not have to be tipped out at the head end, but can at least partially come into contact with the belt conveyor device 8 already by way of the lateral opening 16.

Once the container 15 has been received in the receptacle 3 of the holding installation 5, the pivoting installation 7, conjointly with the belt conveyor device 8 and the container 15, is pivoted, specifically first to an intermediate position illustrated in FIG. 2B. The container 15 herein at least substantially maintains the alignment thereof relative to the belt conveyor device 8. The container 15 optionally slides somewhat closer to the belt conveyor device 8. The pivoting installation 7 herein is not only tilted but is overall also lifted. Without being stopped in the intervening time, the pivoting installation 7 is pivoted up to the emptying alignment which is illustrated in FIG. 2C. The pivoting installation 7 herein is at least predominantly situated in a horizontal alignment, specifically like container 15 and the belt conveyor device 8. The latter herein is disposed in the unloading position.

By way of the lateral opening 16 of the container 15, which now points downward, at least some packages 2 come into contact with the belt conveyor device 8 already before the packages 2 have even been unloaded from the container 15. The container 2 in the present exemplary embodiment therefore has not to be almost placed or rotated, respectively on its head in order for the packages 2 to be unloaded from the container 15, this being necessary when the packages 2 were to be unloaded from a container without a lateral opening and with only an upper opening. There is a downward settling movement of the packages 2 when loading the container 15 illustrated. A renewed settling movement takes place after the pivoting of the container 15 by way of the pivoting installation 7, said renewed settling movement in relation to the container 15 now however acting laterally and in the direction of the belt conveyor device 8. The packages 2 are consequently at least partially unloaded less by the tipping than by the belt conveyor device 8, this being accompanied simultaneously and thus in a space-saving manner with singularizing.

To this end, the belt conveyors 9, disposed beside one another, of the belt conveyor device 8 are set in motion when the pivoting installation 7 has reached the emptying alignment, wherein the central belt conveyor 9 has the lowest transporting speed which is in each case incrementally increased toward the sides. The packages 2, depending on the speed distribution, are thus preferably drawn from the container 15 by way of a corresponding V-shaped or U-shaped speed profile, and herein as a result of the own weight force of said packages and the convex curvature of the transport surface 10 of the belt conveyor device 8 slide more or less laterally, that is to say transversely to the transporting direction T of the belt conveyor device 8, from under the belt conveyor device 8. The packages 2 arriving from the belt conveyor device 8 or the belt conveyor unit 11 are received by lateral belt conveyors 14 which are disposed laterally on both sides beside the belt conveyor device 8 or the belt conveyor unit 11 and which move the packages 2 onward in the same transporting direction T as the belt conveyor device 8 and the belt conveyor unit 11. The lateral belt conveyors 14 disposed behind one another in the transporting direction T are operated at an incrementally ever higher transporting speed so as to further singularize the packages 2 along the transport path.

The belt conveyor device 8 passes packages 2 which are not dispensed by the belt conveyor device 8 to the lateral belt conveyors 14 on the road to the belt conveyor unit 11 which adjoins the belt conveyor device 8 in the transporting direction T. The transporting directions T of the belt conveyor device 8 and the belt conveyor unit 11 match one another like the circumstance that the belt conveyors 12 disposed beside one another of the belt conveyor unit 11 are moved incrementally faster from the inside to the outside, and that the transport surface 13, composed of the individual belt conveyors 12, of the belt conveyor unit 11 is convexly bent upward while forming a U-shaped cross section that is open toward the bottom. The packages 2 which have not yet been dispensed by the belt conveyor device 8 to the lateral belt conveyors 14, by way of the further transport by the belt conveyor unit 11, are consequently dispensed to the lateral belt conveyors 14.

As a result, the different packages 2 take very dissimilar transport paths along the singularizing unloader 1, which can be caused, for example, by the dissimilar arrangement of the packages 2 in the container 15, the dissimilar sizes of the packages 2, and/or the dissimilar weight of the packages 2. The dissimilar transport paths herein are in many cases also associated with dissimilar speed profiles along the transport paths. In combination, this ultimately leads to a compact and efficient unloading and singularizing of the packages 2.

Figure 3A:
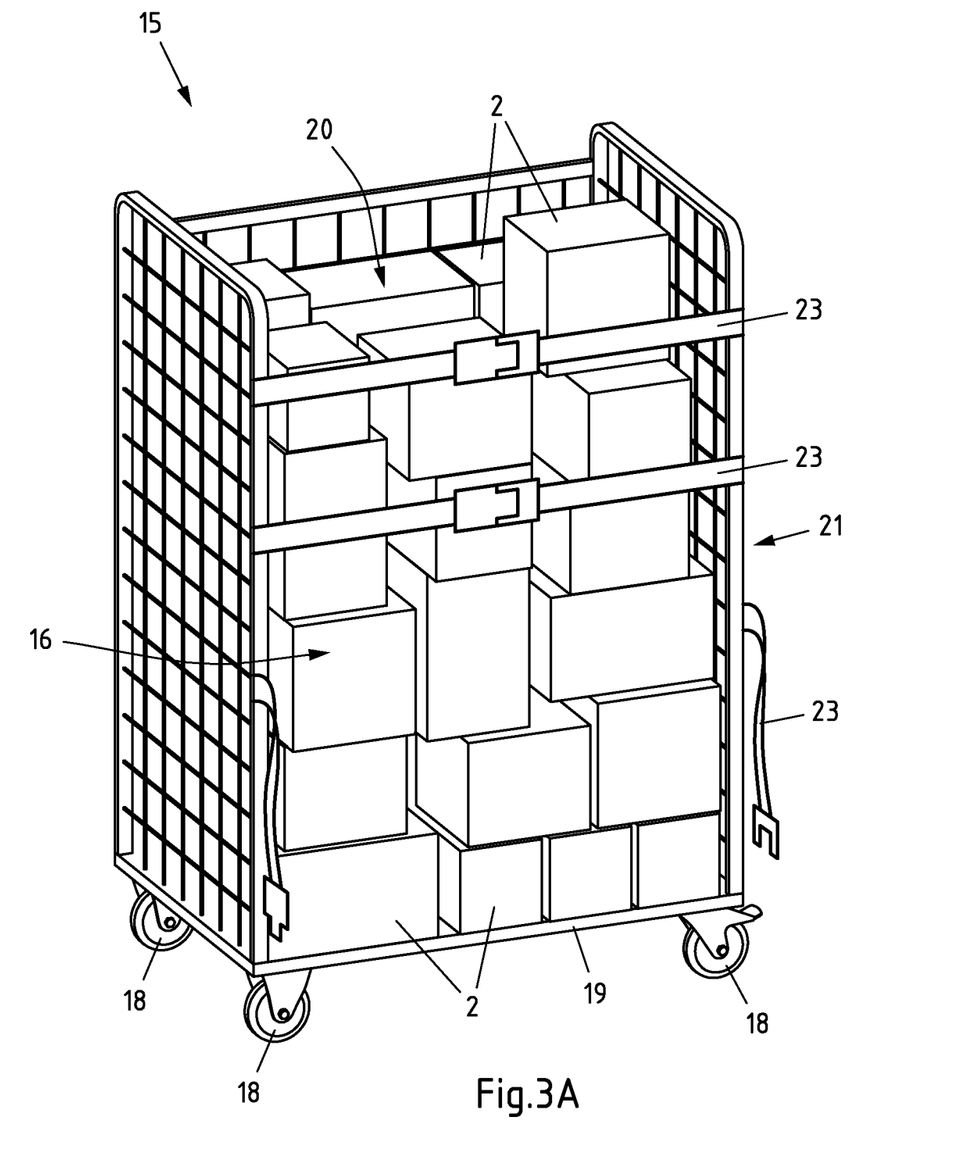
FIGS. 3A-B show a container for use with the singularizing unloader of FIG. 1, in each case in a perspective view.
Figure 3B:
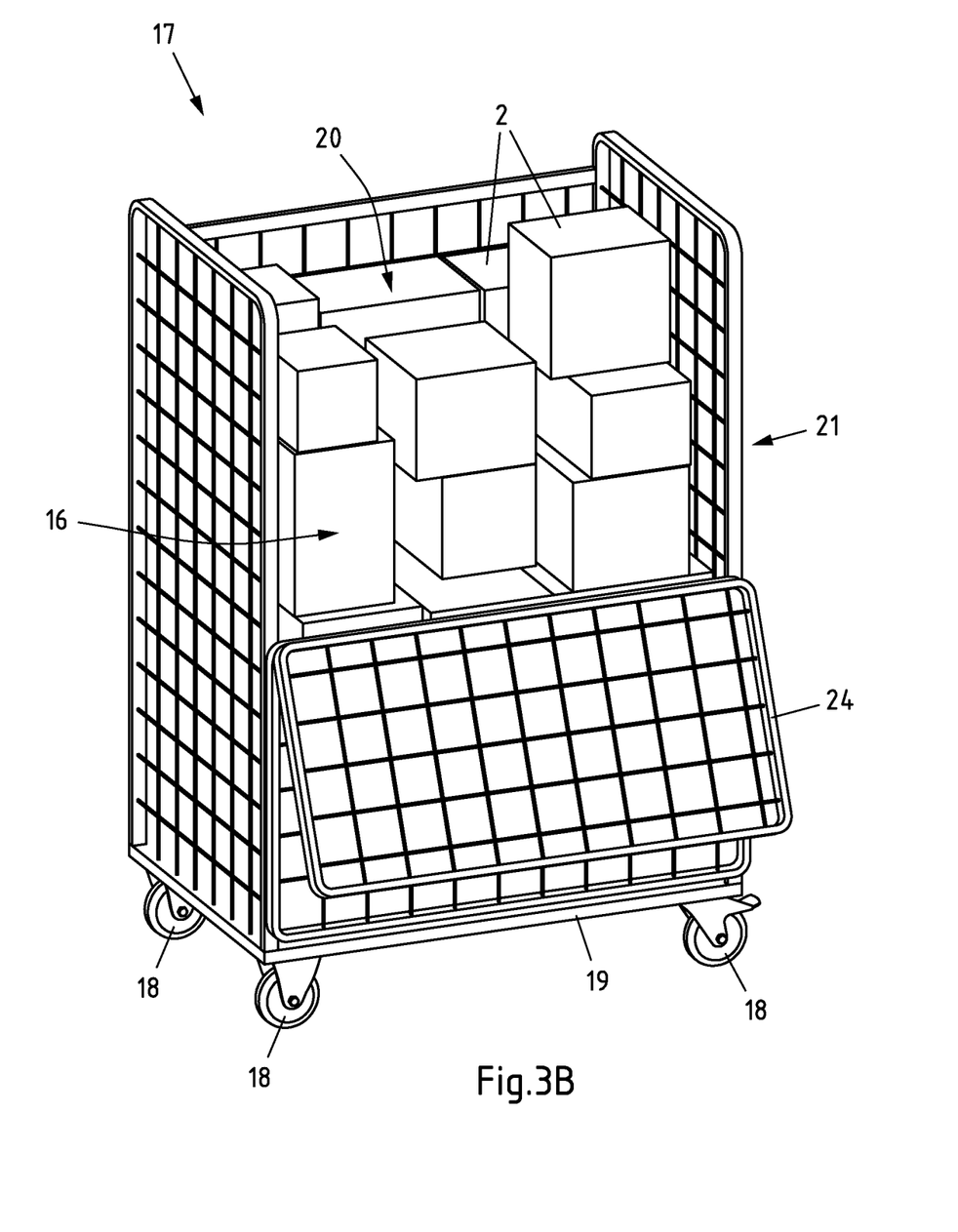

Containers 15, 17 which are particularly suitable for the use with the singularizing unloader 1 are illustrated in FIGS. 3A-B. However, in principle other very dissimilar containers are also suitable. So-called roller containers are illustrated in FIGS. 3A-B. The containers 15, 17 on the base have rollers 18 by way of which the containers 15, 17 can be relocated. For example, the containers 15, 17 can be pushed onto the support surface 4 of the singularizing unloader 1. The containers 15, 17 above the base 19 form a cargo space 20 for receiving packages 2. In order for the containers 15, 17 to be able to be easily loaded with packages 2, a lateral opening 16, 22 which can at least be partially closed when the container 15, 17 is relocated, so that the packages 2 do not fall out, is provided in at least one side wall 21 of the container 15, 17. The opening 16 can extend across the entire height of the respective side wall 21 of the container 15, as is illustrated in FIG. 3A. Alternatively, the lateral opening 22 can however also extend only across part of the side wall 21, as is illustrated in FIG. 3B. In order for the lateral opening 16 to be at least partially closed, a plurality of straps 23 which can be strapped down transversely to the opening 16, or can at least be released again on one side, are disposed so as to be distributed across the height of the opening 16 in the case of the container 15 of FIG. 3A. By contrast, a flap 24 which for closing can be pivoted upward and for opening, thus for releasing the opening 22 in the side wall 21, can be pivoted downward is provided in the case of the container 17 of FIG. 3B. In principle, the flap 24 could alternatively also be pivoted toward the side.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A singularizing unloader for unloading and singularizing packages provided in a container, comprising:
   a pivoting installation for pivoting the container from a predominantly vertical receiving alignment for receiving the container to a predominantly horizontal emptying alignment for emptying the container and vice versa,
   a holding installation for holding the container on the pivoting installation during the pivoting of the pivoting installation from the receiving alignment to the emptying alignment, and
   a belt conveyor device for conveying the packages,
   wherein the belt conveyor device is connected to the pivoting installation in such a manner that the belt conveyor device, by the pivoting of the pivoting installation from the receiving alignment to the emptying alignment, is adjustable from a predominantly vertical initial position to a predominantly horizontal unloading position; and
   wherein the pivoting installation, the holding installation, and the belt conveyor pivot from the predominantly vertical initial position to the predominantly horizontal unloading position conjointly in the same direction.

2. The singularizing unloader according to claim 1, wherein the belt conveyor device comprises a plurality of belt conveyors disposed beside one another, and in that the belt conveyors have at least substantially parallel transporting directions.

3. The singularizing unloader according to claim 2, wherein the transporting speed of inner belt conveyors of the belt conveyor device is slower than the transporting speed of the belt conveyors of the belt conveyor device, and
   wherein the transporting speeds of the belt conveyors increase incrementally from the inside to the outside, transversely to the transporting direction of the belt conveyor device.

4. The singularizing unloader according to claim 2, wherein the belt conveyors of the belt conveyor device are provided so as to be directly mutually contiguous, and/or
   wherein the belt conveyors of the belt conveyor device are configured so as to be of at least substantially identical length.

5. The singularizing unloader according to claim 2,
   wherein in the transporting direction rearward ends of the belt conveyors of the belt conveyor device lie at least substantially on one plane, and/or in that the in the transporting direction forward ends of the belt conveyors of the belt conveyor device lie at least substantially on one plane.

6. The singularizing unloader according to claim 1,
   wherein the belt conveyor device for transporting the packages forms a convexly curved transport surface of the belt conveyor device, and
   wherein the transport surface in at least one cross section perpendicular to the transporting direction of the belt conveyor device is bent so as to be at least substantially U-shaped.

7. The singularizing unloader according to claim 1,
   further comprising a belt conveyor unit, wherein the belt conveyor unit and the belt conveyor device in the unloading position have at least substantially parallel transporting directions, and
   wherein the belt conveyor unit and the belt conveyor device are aligned so as to be at least substantially contiguous behind one another and in particular so as to be mutually aligned.

8. The singularizing unloader according to claim 7, wherein the belt conveyor unit comprises a plurality of belt conveyors disposed beside one another, and wherein the belt conveyors have at least substantially parallel transporting directions.

9. The singularizing unloader according to claim 8, wherein the transporting speed of inner belt conveyors of the belt conveyor unit is slower than the transporting speed of outer belt conveyors of the belt conveyor unit, and
   wherein the transporting speeds of the belt conveyors increase incrementally from the inside to the outside, transversely to the transporting direction of the belt conveyor unit.

10. The singularizing unloader according to claim 8, wherein the belt conveyors of the belt conveyor unit are provided so as to be directly mutually contiguous, and/or
    wherein the belt conveyors of the belt conveyor unit are configured so as to be of at least substantially identical length.

11. The singularizing unloader according to claim 8, wherein in the transporting direction rearward ends of the belt conveyors of the belt conveyor unit lie at least substantially on one plane, and/or wherein in the transporting direction forward ends of the belt conveyors of the belt conveyor unit lie at least substantially on one plane.

12. The singularizing unloader according to claim 7,
    wherein the belt conveyor unit for transporting the packages forms a convexly curved transport surface of the belt conveyor unit, and
    wherein the convexly curved transport surface in at least one cross section perpendicular to the transporting direction of the belt conveyor unit is bent so as to be at least substantially U-shaped.

13. The singularizing unloader according to claim 1,
wherein at least one lateral belt conveyor adjoins in each case the belt conveyor device in the unloading position on both sides thereof, and/or
wherein at least one lateral belt conveyor adjoins in each case the belt conveyor unit on both sides.

14. The singularizing unloader according to claim 13, wherein a plurality of lateral belt conveyors that are operable at dissimilar transporting speeds are disposed behind one another, in particular so as to be aligned, at least on one side of the belt conveyor device and/or the belt conveyor unit.

15. The singularizing unloader according to claim 1, wherein the holding installation comprises a receptacle and/or a support surface for the container,
wherein the receptacle and/or the support surface, conjointly with the belt conveyor device are/is adjustable from the initial position to the unloading position, and
wherein the support surface and the belt conveyor device define planes that are mutually disposed at an angle from 60° to 90°.

16. A method for operating a singularizing unloader according to claim 1, comprising the steps of:
holding the container by way of the holding installation on the pivoting installation,
pivoting the container by way of the pivoting installation from the receiving alignment to the emptying alignment, and
at least partially transporting the packages of the container out of the container by the belt conveyor device.

17. The method according to claim 16, further comprising the steps of:
holding the container by way of a lateral opening that faces the belt conveyor device on the pivoting installation, and
contacting packages, with the belt conveyor device in the unloading position, with the belt conveyor device by way of the lateral opening of the container.

18. The method according to claim 16, further comprising the steps of:
moving the at least one belt conveyor of the belt conveyor device at least with the belt conveyor device in the unloading position, in the transporting direction, and/or
moving the belt conveyors provided beside one another of the belt conveyor device in each case at a transporting speed that increases incrementally from the inside to the outside.

19. The method according to claim 16, wherein the transport surface comprises a convex transport surface and wherein the method further comprises the steps of:
sliding the packages at least partially along the convex transport surface of the belt conveyor device laterally downward onto at least one lateral belt conveyor, and/or
at least partially singularizing the packages along a plurality of lateral belt conveyors that are disposed behind one another.

20. The method according to claim 16, further comprising the steps of:
at least partially transferring the packages from the belt conveyor device in the unloading position in the transporting direction of the belt conveyor device to a belt conveyor unit which adjoins the belt conveyor device and
at least partially transporting the transferred packages from the belt conveyor unit in a transporting direction that is at least substantially parallel to the transporting direction of the belt conveyor device.

21. The method according to claim 20, further comprising the step of:
moving the belt conveyors, provided beside one another, of the belt conveyor unit in each at a transporting speed that increases incrementally from the inside to the outside.

22. The method according to claim 16, further comprising the step of:
sliding the packages at least partially along the convex belt conveyor unit laterally downward onto at least one lateral belt conveyor, and/or
at least partially singularizing the packages along a plurality of lateral belt conveyors that are disposed behind one another.

23. The method according to claim 16, further comprising the steps of:
moving or placing the container in the receiving alignment of the pivoting installation onto the support surface for the container and
holding the container standing on the support surface during the pivoting of the pivoting installation by the holding installation, in particular is received by the receptacle.

24. The singularizing unloader according to claim 2, wherein the plurality of belt conveyors disposed beside one another is at least three belt conveyors.

25. The singularizing unloader according to claim 2, wherein the plurality of belt conveyors disposed beside one another is at least five belt conveyors.

26. The singularizing unloader according to claim 2, wherein the plurality of belt conveyors disposed beside one another is at least seven belt conveyors.

27. The singularizing unloader according to claim 15, wherein the support surface and the belt conveyor device define planes that are mutually disposed at an angle from 70° to 90°.

28. The singularizing unloader according to claim 15, wherein the support surface and the belt conveyor device define planes that are mutually disposed at an angle from 80° to 90°.

29. A method for operating a singularizing unloader, the singularizing unloader for unloading and singularizing packages provided in a container, the container comprising a base, a plurality of side walls extending vertically from the base to define a cargo space for receiving the packages, and a lateral opening provided between side walls that leads into the cargo space, the singularizing unloader comprising:
a pivoting installation for pivoting the container from a predominantly vertical receiving alignment for receiving the container to a predominantly horizontal emptying alignment for emptying the container and vice versa,
a holding installation for holding the container on the pivoting installation during the pivoting of the pivoting installation from the receiving alignment to the emptying alignment, and
a belt conveyor device comprising a transport surface for conveying the packages,
wherein the belt conveyor device is connected to the pivoting installation in such a manner that the belt conveyor device, by the pivoting of the pivoting installation from the receiving alignment to the emptying alignment, is adjustable from a predominantly vertical initial position to a predominantly horizontal unloading position; and wherein the holding installation is configured to hold the container so that the lateral opening is arranged facing the transport surface of the belt conveyor in the receiving alignment and in the emptying alignment the method, comprising the steps of:

holding the container by way of the holding installation on the pivoting installation in the receiving alignment such that the lateral opening faces the transport surface of the belt conveyor device, pivoting the container by way of the pivoting installation from the receiving alignment to the emptying alignment, and at least partially transporting the packages of the container out of the container by the belt conveyor device;

wherein the transport surface comprises a convex transport surface and wherein the method further comprises the steps of:

sliding the packages at least partially along the convex transport surface of the belt conveyor device laterally downward onto at least one lateral belt conveyor, and/or at least partially singularizing the packages along a plurality of lateral belt conveyors that are disposed behind one another;

wherein the packages at least partially singularized on the plurality of lateral belt conveyors are aligned behind one another.

30. The method according to claim 20, wherein the belt conveyor unit adjoins the belt conveyor device so as to be aligned therewith.

31. A method for operating a singularizing unloader, the singularizing unloader for unloading and singularizing packages provided in a container, the container comprising a base, a plurality of side walls extending vertically from the base to define a cargo space for receiving the packages, and a lateral opening provided between side walls that leads into the cargo space, the singularizing unloader comprising:

a pivoting installation for pivoting the container from a predominantly vertical receiving alignment for receiving the container to a predominantly horizontal emptying alignment for emptying the container and vice versa, a holding installation for holding the container on the pivoting installation during the pivoting of the pivoting installation from the receiving alignment to the emptying alignment, and a belt conveyor device comprising a transport surface for conveying the packages, wherein the belt conveyor device is connected to the pivoting installation in such a manner that the belt conveyor device, by the pivoting of the pivoting installation from the receiving alignment to the emptying alignment, is adjustable from a predominantly vertical initial position to a predominantly horizontal unloading position; and wherein the holding installation is configured to hold the container so that the lateral opening is arranged facing the transport surface of the belt conveyor in the receiving alignment and in the emptying alignment the method, comprising the steps of:

holding the container by way of the holding installation on the pivoting installation in the receiving alignment such that the lateral opening faces the transport surface of the belt conveyor device, pivoting the container by way of the pivoting installation from the receiving alignment to the emptying alignment, and at least partially transporting the packages of the container out of the container by the belt conveyor device;

wherein the conveyor belt comprises a convex conveyor belt and wherein the method further comprises the steps of:

sliding the packages at least partially along the convex belt conveyor unit laterally downward onto at least one lateral belt conveyor, and/or at least partially singularizing the packages along a plurality of lateral belt conveyors that are disposed behind one another;

wherein the packages at least partially singularized on the plurality of lateral belt conveyors so as to be aligned behind one another.

* * * * *